US012695978B2

(12) United States Patent
Thomas et al.

(10) Patent No.: US 12,695,978 B2
(45) Date of Patent: Jul. 28, 2026

(54) METHODS, STORAGE MEDIA, AND SYSTEMS FOR SELECTING AN OPTIMAL IMAGE FRAME WITHIN A CAPTURE WINDOW

(71) Applicant: Hover Inc., San Francisco, CA (US)

(72) Inventors: Matthew Thomas, Nashville, TN (US); Hongyuan He, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 88 days.

(21) Appl. No.: 18/632,867

(22) Filed: Apr. 11, 2024

(65) Prior Publication Data

US 2024/0348913 A1 Oct. 17, 2024

Related U.S. Application Data

(60) Provisional application No. 63/632,495, filed on Apr. 10, 2024, provisional application No. 63/496,269, filed on Apr. 14, 2023, provisional application No. 63/496,275, filed on Apr. 14, 2023.

(51) Int. Cl.
H04N 23/63 (2023.01)

(52) U.S. Cl.
CPC .................................. H04N 23/632 (2023.01)

(58) Field of Classification Search
CPC ................. H04N 23/632; H04N 13/25; H04N 21/23412; H04N 5/2226; H04N 5/2258; H04N 5/23229; H04N 5/23296; H04N 5/2351; G06K 9/3233
See application file for complete search history.

(56) References Cited

U.S. PATENT DOCUMENTS

| | | |
|---|---|---|
| 2010/0177197 A1 | 7/2010 | Kimura et al. |
| 2015/0071547 A1* | 3/2015 | Keating .................. G06F 18/24 |
| | | 382/224 |
| 2017/0155887 A1 | 6/2017 | Zhou |
| 2019/0026902 A1* | 1/2019 | Kiyamura ................. G06T 5/73 |
| 2021/0075970 A1* | 3/2021 | Jain ......................... G06V 10/25 |
| 2022/0094846 A1* | 3/2022 | Lv ........................... H04N 23/64 |

OTHER PUBLICATIONS

PCT Invitation to Pay Additional Fees dated Jul. 29, 2024 for PCT/US2024/024333, 14 pages.
PCT Search Report and Written Opinion dated Sep. 19, 2024 for PCT/US2024/024333, 21 pages.

* cited by examiner

*Primary Examiner* — Xi Wang

(57) ABSTRACT

Methods, storage media, and systems for selecting an optimal two-dimensional image frame within one or more capture windows for a three-dimensional reconstruction pipeline. The method may include generating one or more capture windows. Each capture window may be proximate to a detected actuation, relative to a first image frame, or a combination thereof. A plurality of candidate image frames and sensor data may be captured within each capture window, assigned to each capture window, or a combination thereof. A frame cost for each candidate image frame may be generated based on sensor data, image data, or a combination thereof. An optimal image frame may be selected based on frame cost, sensor data, image data, or a combination thereof. The optimal image frame may be stored. Image frames other than the optimal image frame may be distinguished.

20 Claims, 6 Drawing Sheets

METHODS, STORAGE MEDIA, AND SYSTEMS FOR SELECTING AN OPTIMAL IMAGE FRAME WITHIN A CAPTURE WINDOW

CROSS REFERENCE TO RELATED APPLICATIONS

The present application claims priority to U.S. provisional patent application 63/632,495 entitled "METHODS, STORAGE MEDIA, AND SYSTEMS FOR SELECTING AN OPTIMAL IMAGE FRAME WITHIN A CAPTURE WINDOW" filed Apr. 10, 2024, U.S. provisional patent application 63/496,269 entitled "METHODS, STORAGE MEDIA, AND SYSTEMS FOR IMAGE CAPTURE" filed Apr. 14, 2023, and U.S. provisional patent application 63/496,275 entitled METHODS, STORAGE MEDIA, AND SYSTEMS FOR IMAGE CAPTURE filed Apr. 14, 2023, which are hereby incorporated by reference in their entirety and made part of the present application for all purposes.

BACKGROUND

Field of the Disclosure

The present disclosure relates to methods, storage media, and systems for selecting an image frame, for example selecting an optimal two-dimensional image frame within a capture window for a three-dimensional reconstruction pipeline.

Brief Description of the Related Art

In the realm of digital photography, capturing clear and sharp image frames is often challenged by motion blur, which can occur when either the camera or the subject moves during the exposure time of the camera's sensor. Motion blur can significantly degrade the quality of an image, making it difficult to discern fine details. Traditional methods to counteract this issue have included increasing the shutter speed to reduce exposure time, using optical image stabilization (OIS) to mechanically compensate for camera movement, employing digital signal processing techniques to post-process the image frames in an effort to mitigate the effects of blur, or a combination thereof.

The effectiveness of increasing shutter speed is limited by the available light and the potential for increased noise in the resulting image frame. Optical image stabilization systems, while beneficial, add complexity and cost to the camera design and are not always effective against all types of motion. Digital signal processing to post-process the image frames can enhance the image frames after they have been captured, but this often requires significant computational resources and may not always restore the desired level of detail in the image frame.

The challenge remains to provide a way to utilize image data and/or sensor data to enhance the quality of captured image frames in real-time, particularly in portable devices where computational resources, energy efficiency, storage space, and upload bandwidth are critical considerations.

SUMMARY

A prerequisite of many applications that use image frames as input is that the image frames are clear and sharp, or, said differently, not blurry. The images frames are captured by one or more cameras of a capture device. The capture device may be handheld, such as a mobile device, a tablet computer, a headset, and the like. Camera functions (e.g., shutter speed), user functions (e.g., capture device rotation and/or translation), and/or scene functions (e.g., lighting, depth, etc.) may lead to images that are not clear and sharp, or, said differently, that are blurry.

The techniques described herein have broad applications across various industries where image clarity and sharpness are paramount and the need for real-time processing is critical, such as three-dimensional reconstruction that relies on clear pixels in images for feature detection or matching. These techniques do not require additional hardware, such as stabilization hardware, or image post processing. Instead, the techniques disclosed herein leverage image data of image frames captured by one or more cameras of a capture device, sensor data captured by one or more sensors of the capture device, or a combination thereof, to select an optimal image frame according to image conditions, capture device conditions, or a combination thereof, and, in some embodiments, a capture frame rate. The selected optimal image frame may be stored and used in one or more downstream services, such as three-dimensional reconstruction.

The problem of an image frame having conditions adverse to a computer vision function at time of camera activation is solved by generating a capture window, capturing multiple candidate image frames within the capture window and/or assigning multiple candidate image frames to the capture window, and selecting an image frame from the multiple image frames in the capture window with optimal conditions for the computer vision function. In some embodiments, the adverse image frame conditions may be image blur and the computer vision function may be, wholly or a portion of, a three-dimensional (3D) reconstruction pipeline, for example including feature detection, feature matching, and the like. Image blur may manifest relative to camera functions (e.g., shutter speed), user functions (e.g., capture device rotation and/or translation), and/or scene functions (e.g., lighting, depth, etc.). In these embodiments, the selected image frame with optimal conditions for the computer vision function may be the least blurry image frame of the multiple image frames in the capture window. In other words, the optimal conditions for the computer vision function may be the least amount of blur. The selected optimal image frame may be stored, and the other image frames may be distinguished. In some embodiments, selecting the optimal image frame, for example at time of capture, may be used to prevent suboptimal image frames from being stored and used downstream, such as for the 3D reconstruction pipeline. The disclosure addresses what may otherwise be a traditionally subjective process performed by humans into a mathematically structured one, the details of which are disclosed herein. For example, image-based techniques, sensor-based techniques, or a combination thereof disclosed herein replace subjective interpretation by humans to select an image frame from multiple candidate image frames in a capture window with optimal conditions for a computer vision function.

Some aspects of the present disclosure relate to a method of selecting an optimal two-dimensional image frame within a capture window for a three-dimensional reconstruction pipeline. The method may include detecting an actuation of a capture function at a capture device. The method may include generating a capture window comprising a plurality of image frames proximate to the detected actuation. The method may include capturing, within the capture window, a plurality of candidate image frames and sensor data of the capture device, wherein the plurality of image frames are captured by a camera of the capture device at a capture frame rate, and wherein the sensor data is associated with the plurality of candidate image frames and related to the capture frame rate. The method may include selecting an optimal image frame of the plurality of candidate image frames based on at least one of image data of the plurality of candidate image frames and the sensor data of the capture device. The method may include storing the selected optimal image frame of the plurality of candidate image frames.

Some aspects of the present disclosure relate to one or more non-transitory computer-readable media storing instructions that, when executed by one or more processors, cause the one or more processors to perform a method of selecting an optimal two-dimensional image frame within a capture window for a three-dimensional reconstruction pipe-line. The method may include detecting an actuation of a capture function at a capture device. The method may include generating a capture window comprising a plurality of image frames proximate to the detected actuation. The method may include capturing, within the capture window, a plurality of candidate image frames and sensor data of the capture device, wherein the plurality of image frames are captured by a camera of the capture device at a capture frame rate, and wherein the sensor data is associated with the plurality of candidate image frames and related to the capture frame rate. The method may include selecting an optimal image frame of the plurality of candidate image frames based on at least one of image data of the plurality of candidate image frames and the sensor data of the capture device. The method may include storing the selected optimal image frame of the plurality of candidate image frames.

Some aspects of the present disclosure relate to a system for selecting an optimal two-dimensional image frame within a capture window for a three-dimensional reconstruction pipeline. The system may include one or more processors and memory storing instructions that, when executed by the one or more processors, cause the system to perform a method. The method may include detecting an actuation of a capture function at a capture device. The method may include generating a capture window comprising a plurality of image frames proximate to the detected actuation. The method may include capturing, within the capture window, a plurality of candidate image frames and sensor data of the capture device, wherein the plurality of image frames are captured by a camera of the capture device at a capture frame rate, and wherein the sensor data is associated with the plurality of candidate image frames and related to the capture frame rate. The method may include selecting an optimal image frame of the plurality of candidate image frames based on at least one of image data of the plurality of candidate image frames and the sensor data of the capture device. The method may include storing the selected optimal image frame of the plurality of candidate image frames.

Some aspects of the present disclosure relate to a method of selecting an optimal two-dimensional image frame within a capture window for a three-dimensional reconstruction pipeline. The method may include generating a capture window comprising a plurality of image frames relative to a first image frame. The method may include assigning a plurality of candidate image frames to the capture window, wherein each candidate image frame is associated with sensor data of a capture device. The method may include, for each candidate image frame of the plurality of candidate image frames in the capture window, generating a frame cost based on at least one of sensor data associated with the candidate image frame and image data of the candidate image frame. The method may include selecting an optimal image frame of the plurality of candidate image frames in the capture window based on a lower frame cost relative to at least one other candidate image frame of the plurality of candidate image frames. The method may include storing the selected optimal image frame of the plurality of candidate image frames.

Some aspects of the present disclosure relate to one or more non-transitory computer-readable media storing instructions that, when executed by one or more processors, cause the one or more processors to perform a method of selecting an optimal two-dimensional image frame within a capture window for a three-dimensional reconstruction pipeline. The method may include generating a capture window comprising a plurality of image frames relative to a first image frame. The method may include assigning a plurality of candidate image frames to the capture window, wherein each candidate image frame is associated with sensor data of a capture device. The method may include, for each candidate image frame of the plurality of candidate image frames in the capture window, generating a frame cost based on at least one of sensor data associated with the candidate image frame and image data of the candidate image frame. The method may include selecting an optimal image frame of the plurality of candidate image frames in the capture window based on a lower frame cost relative to at least one other candidate image frame of the plurality of candidate image frames. The method may include storing the selected optimal image frame of the plurality of candidate image frames.

Some aspects of the present disclosure relate to a system for selecting an optimal two-dimensional image frame within a capture window for a three-dimensional reconstruction pipeline. The system may include one or more processors and memory storing instructions that, when executed by the one or more processors, cause the system to perform a method. The method may include generating a capture window comprising a plurality of image frames relative to a first image frame. The method may include assigning a plurality of candidate image frames to the capture window, wherein each candidate image frame is associated with sensor data of a capture device. The method may include, for each candidate image frame of the plurality of candidate image frames in the capture window, generating a frame cost based on at least one of sensor data associated with the candidate image frame and image data of the candidate image frame. The method may include selecting an optimal image frame of the plurality of candidate image frames in the capture window based on a lower frame cost relative to at least one other candidate image frame of the plurality of candidate image frames. The method may include storing the selected optimal image frame of the plurality of candidate image frames.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
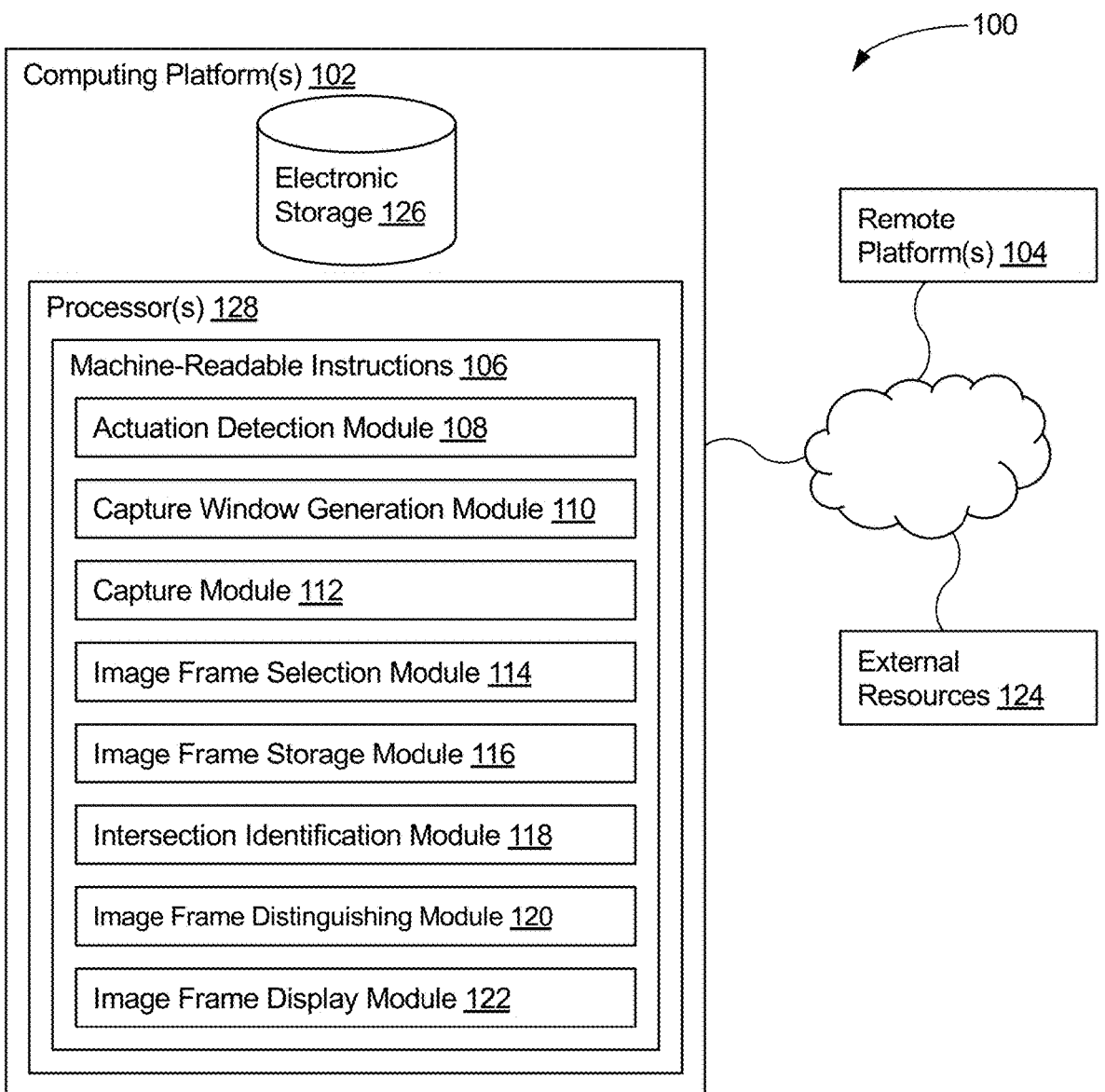
FIG. 1 illustrates a system configured for selecting an optimal two-dimensional (2D) image frame within a capture window, in accordance with one or more implementations.

FIG. 1 illustrates a system 100 configured for selecting an optimal two-dimensional (2D) image frame within a capture window, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of actuation detection module 108, capture window generation module 110, capture module 112, image frame selection module 114, image frame storage module 116, intersection identification module 118, image frame distinguishing module 120, image frame display module 122, and/or other instruction modules.

Actuation detection module 108 may be configured to detect an actuation of a capture function at a capture device. By way of non-limiting example, the capture device may be one of a smartphone, a tablet computer, a drone, and an aerial platform. In some embodiments, the capture function may be a physical button of the capture device, such as a shutter button, that, when actuated, may cause the capture device to capture one or more image frames. The capture function may be a digital button of the capture device, such as an interface element displayed on a touchscreen display, that, when actuated, may cause the capture device to capture one or more image frames.

Capture window generation module 110 may be configured to generate a capture window comprising a plurality of image frames proximate to the detected actuation. In some embodiments, the number of image frames in the capture window may be related to thresholds disclosed here. In some examples, a capture window associated with a large spatial threshold may include more image frames than a capture window associated with a small spatial threshold. In some examples, a capture window associated with a large temporal threshold may include more image frames than a capture window associated with a small temporal threshold. In some embodiments, more image frames may be desirable over fewer image frames as more image frames may provide more choices for an optimal image frame (e.g., more signal). In some embodiments, fewer image frames may be desirable over more image frames as fewer image frames may provide fewer similar choices for an optimal image frame (e.g., less noise).

In some embodiments, the capture window may be spatially proximate to a pose associated with the detected actuation. For example, the capture window may be spatially proximate to a pose of the capture device associated with when the actuation is detected.

A beginning of the capture window may be greater than a first threshold translation from the pose associated with the detected actuation and an end of the capture window may be less than a second threshold translation from the pose associated with the detected actuation. In some embodiments, the first threshold translation and the second threshold translation may be in units of pixels. In some embodiments, the first threshold translation and the second threshold translation may be in units of meters. In some embodiments, the first threshold translation may be 0 meters and the second threshold translation may be 0.5 meters. In these embodiments, the capture window may include image frames within 0.5 meters of the pose associated with the detected actuation.

A beginning of the capture window may be greater than a first threshold rotation from the pose associated with the detected actuation and an end of the capture window may be less than a second threshold rotation from the pose associated with the detected actuation. In some embodiments, the first threshold rotation and the second threshold rotation may be in units of pixels. In some embodiments, the first threshold rotation and the second threshold rotation may be in units of radians. In some embodiments, the first threshold rotation may be 0 radians and the second threshold rotation may be 0.22 radians. In these embodiments, the capture window may include image frames within 0.22 radians of the pose associated with the detected actuation.

In some embodiments, the capture window may be temporally proximate to a time associated with the detected actuation. In some embodiments, the capture window may be a function of capture frame rate. In some embodiments, the capture window may be inversely related to the capture frame rate. For example, if the capture frame rate is fast, the capture window may be small, and if the capture frame rate is slow, the capture window may be large.

A beginning of the capture window may be greater than a first threshold time from the time associated with the detected actuation and an end of the capture window is less than a second threshold time from the time associated with the detected actuation. In some embodiments, the capture window may be in units of seconds and may be expressed in units of image frames. In some embodiments, the first threshold time may be −1 seconds and the second threshold time may be 0 seconds. In these embodiments, the capture window may include image frames within 1 second before the detected actuation. In some embodiments, the first threshold may be −0.5 seconds and the second threshold time may be +0.5 seconds. In these embodiments, the capture window may include image frames within 0.5 seconds before the detected actuation and 0.5 seconds after the detected actuation. In some embodiments, the first threshold time may be 0 seconds and the second threshold time may be +1 second. In these embodiments, the capture window may include image frames within 1 second after the detected actuation. In some embodiments, one or more modules, such as capture module 112, may continually capture image frames and those captured image frames may be stored, for example in an image frame buffer, cache, temporary memory, temporary storage, and the like, and associated with the capture window responsive to the detected actuation. In some embodiments, the beginning of the capture window may be temporally before the time associated with the detected actuation, and the end of the capture window may be temporally before the time associated with the detected actuation. In these embodiments, the capture window includes image frames that were captured before to the detected actuation. In some embodiments, the beginning of the capture window may be temporally before the time associated with the detected actuation, and the end of the capture window may be temporally after the time associated with the detected actuation. In these embodiments, the capture window includes image frames that were captured both before and after the detected actuation. In some embodiments, the beginning of the capture window may be temporally after the time associated with the detected actuation, and the end of the capture window may be temporally after the first threshold time. In these embodiments, the capture window includes image frames that were captured after the detected actuation.

Capture module 112 may be configured to capture, within the capture window, a plurality of candidate image frames and sensor data of the capture device. The plurality of candidate image frames are captured by a camera of the capture device at a capture frame rate and the sensor data is associated with the plurality of candidate image frames and related to the capture frame rate. In some embodiments, capture module 112 may capture the plurality of candidate images based on optical flow. By way of non-limiting example, the sensor data may include at least one of inertial sensor data, accelerometer sensor data, gyroscope sensor data, magnetometer sensor data, altimeter sensor data, light sensor data, camera sensor data, pose sensor data, visual data, and depth data.

Image frame selection module 114 may be configured to select an optimal image frame of the plurality of candidate image frames based on at least one of image data of the plurality of candidate images and the sensor data of the capture device. In some embodiments, selecting the optimal image frame of the plurality of candidate image frames includes selecting a least blurry image frame of the plurality of candidate image frames.

In some embodiments, image frame selection module 114 may select the optimal image frame of the plurality of candidate image frames by comparing sensor data associated with each image frame of the plurality of candidate image frames to sensor data associated with each other image frame of the plurality of candidate image frames.

In some embodiments, for each candidate image frame of the plurality of candidate image frames, image frame selection module 114 may determine a shutter speed associated with the candidate image frame based on the sensor data. Image frame selection module 114 may select the image frame of the plurality of candidate image frames associated with the fastest shutter speed. In some embodiments, fastest shutter speed may correspond an optimal image frame.

In some embodiments, for each candidate image frame of the plurality of candidate image frames, image frame selection module 114 may determine a degree of capture device rotation associated with the candidate image based on the sensor data. The degree of capture device rotation may be relative to one other candidate image frame of the plurality of candidate image frames. Image frame selection module 114 may select the image frame of the plurality of candidate image frames associated with the lowest degree of capture device rotation. In some embodiments, lowest degree of capture device rotation may correspond to an optimal image frame.

In some embodiments, for each candidate image frame of the plurality of candidate image frames, image frame selection module 114 may determine a rate of capture device rotation associated with the candidate image frame based on the sensor data. The rate of capture device rotation may be relative to one other candidate image frame of the plurality of candidate image frames. Image frame selection module 114 may select the image frame of the plurality of candidate image frames associated with the lowest rate of capture device rotation. In some embodiments, lowest rate of capture device rotation may correspond to an optimal image frame.

In some embodiments, for each candidate image frame of the plurality of candidate image frames, image frame selection module 114 may determine a degree of capture device translation associated with the candidate image frame based on the sensor data. The degree of capture device translation may be relative to one other candidate image frame of the plurality of candidate images frames. Image frame selection module 114 may select the image frame of the plurality of candidate image frames associated with the lowest degree of capture device translation. In some embodiments, lowest degree of capture device translation may correspond to an optimal image frame.

In some embodiments, for each candidate image frame of the plurality of candidate image frames, image frame selection module 114 may determine a rate of capture device translation associated with the candidate image frame based on the sensor data. The rate of capture device translation may be relative to one other candidate image frames of the plurality of candidate image frames. Image frame selection module 114 may select the image frame of the plurality of candidate image frames associated with the lowest rate of capture device translation. In some embodiments, lowest rate of capture device translation may correspond to an optimal image frame.

In some embodiments, for each candidate image frame of the plurality of candidate image frames, image frame selection module 114 may calculate a total number of blurred pixels. In some embodiments, image frame selection module 114 may compute image blur for one or more pixels of an image using one or more signal processing techniques such as, for example, computing Fast Fourier Transforms (FFTs) of the image and examining a distribution of low and high frequencies, computing a convolution of a Laplacian kernel across the image and computing a variance of the response, and the like. If the computed image blur is greater than an image blur threshold, the image frame selection module 114 may classify the one or more pixels of the image as being blurry. Image frame selection module 114 may select the image frame of the plurality of candidate image frames associated with the fewest total number of blurred pixels. In some embodiments, fewest total number of blurred pixels may correspond to an optimal image frame.

In some embodiments, for each candidate image frame of the plurality of candidate image frames, image frame selection module 114 may identify one or more architectural features. In some embodiments, image frame selection module 114 may select the image frame of the plurality of candidate image frames including the most architectural features. In some embodiments, most architectural features may correspond to an optimal image frame. By way of non-limiting example, architectural features may include at least one of ground planes, wall planes, ceiling planes, doors, and windows. In some embodiments, if multiple candidate image frames qualify as optimal image frames as per the other aforementioned criteria, most architectural features may be used to select an optimal image frame.

In some embodiments, image frame selection module 114 may select the image frame of the plurality of candidate image frames including the most intersections of architectural features. Intersection identifying module 118 may be configured to identify intersections of one or more architectural features. In some embodiments, most intersections of architectural features may correspond to an optimal image frame. Examples of intersections of architectural features include inter- and/or intra-intersections between planes such as ground planes, wall planes, and ceiling planes, between doors and planes such as ground planes, wall planes, and ceiling planes, between windows and wall planes, and the like. In some embodiments, if multiple candidate image frames qualify as optimal image frames as per the other aforementioned criteria, most intersections of architectural features may be used to select an optimal image frame.

In some embodiments, for each candidate image frame of the plurality of candidate image frames, image frame selection module 114 may identify a planar surface in the candidate image frame and calculate an angle between an optical axis of the capture device and a normal of the planar surface, for example based on the sensor data. Image frame selection module 114 may select the image frame of the plurality of candidate image frames associated with the largest angle. In some embodiments, largest angle may correspond to an optimal image. In some embodiments, the larger the angle, the more parallel the capture device and the planar surface, such as a wall, are. In some embodiments, larger angles may be desirable for vanishing line estimation and depth calculation purpose.

In some embodiments, for each candidate image frame of the plurality of candidate image frames, image frame selection module 114 may identify a planar surface in the candidate image frame and calculate an angle between an optical axis of the capture device and a normal of the planar surface, for example based on the sensor data. Image frame selection module 114 may select the image frame of the plurality of candidate image frames associated with the smallest angle. In some embodiments, the smaller the angle, the more orthogonal the capture device and the planar surface, such as a wall, are. In some embodiments, smaller angles may be desirable for planar surface coverage as depicted in images.

In some embodiments, image frame selection module 114 may be configured to select an optimal image frame of the plurality of candidate image frames based on two or more of the aforementioned, for example based on a weighted combination of two or more of the aforementioned.

In some embodiments, image frame selection module 114 may be configured to select an optimal image frame of a plurality of candidate image frames of a plurality of capture windows. In these embodiments, capture window generation module 110 may be configured to generate the plurality of capture windows. In some embodiments, image frame selection module 114 may be configured to select an optimal image frame of each of the plurality of capture windows, and further select an optimal image frame of a plurality of optimal image frames.

Image frame storage module 116 may be configured to store the selected optimal image frame of the plurality of candidate image frames.

Image frame distinguishing module 120 may be configured to distinguish candidate image frames of the plurality of candidate image frames other than the selected optimal image frame.

Image display module 122 may be configured to display, on a display of the capture device, the selected optimal image frame. In some embodiments, image display module 122 may be configured to display, on the display of the capture device, candidate image frames of the plurality of candidate image frames other than the selected optimal image frame.

In some implementations, computing platform(s) 102, remote platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 124 may be operatively linked via some other communication media.

A given remote platform 104 may include one or more processors configured to execute computer program modules. The computer program modules may be configured to enable an expert or user associated with the given remote platform 104 to interface with system 100 and/or external resources 124, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Computing platform(s) 102 may include electronic storage 126, one or more processors 128, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 126 may comprise non-transitory storage media that electronically stores information. The electronic storage media of electronic storage 126 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from computing platform(s) 102, information received from remote platform(s) 104, and/or other information that enables computing platform(s) 102 to function as described herein.

Processor(s) 128 may be configured to provide information processing capabilities in computing platform(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
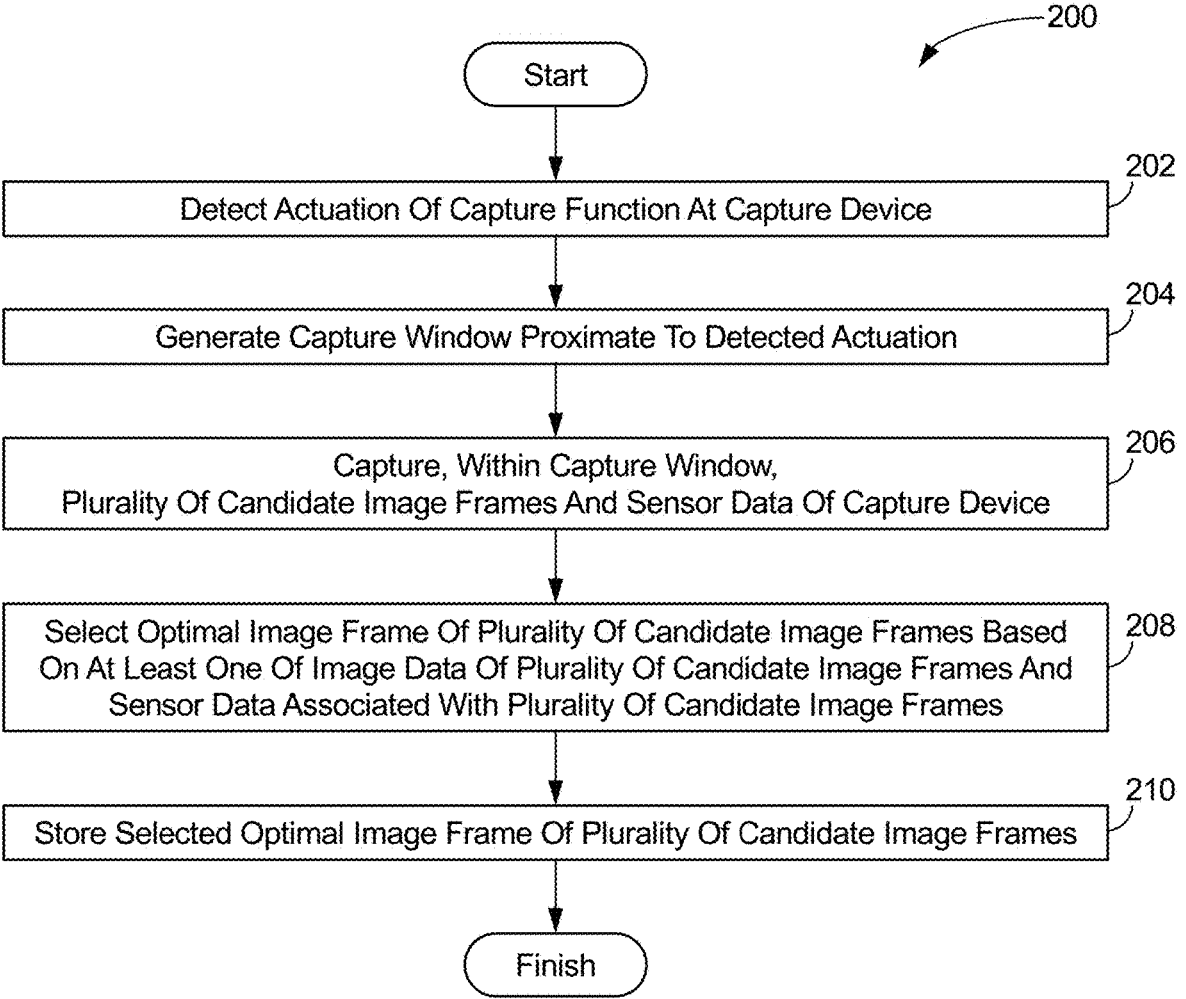
FIG. 2 illustrates a method for selecting an optimal 2D image frame within a capture window, in accordance with one or more implementations.

FIG. 2 illustrates a method 200 for selecting an optimal 2D image frame within a capture window, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include detecting an actuation of a capture function at a capture device. By way of non-limiting example, the capture device may be one of a smartphone, a tablet computer, a drone, and an aerial platform. In some embodiments, the capture function may be a physical button of the capture device, such as a shutter button, that, when actuated, may cause the capture device to capture one or more image frames. In some embodiments, the capture function may be a digital button of the capture device, such as an interface element displayed on a touchscreen display, that, when actuated, may cause the capture device to capture one or more image frames. Operation 202 may be performed by one or more hardware processors configured by machine-readable instructions including a module that is the same as or similar to actuation detection module 108, in accordance with one or more implementations.

An operation 204 may include generating a capture window comprising a plurality of image frames proximate to the detected actuation. In some embodiments, the number of image frames in the capture window may be related to thresholds disclosed here. In some examples, a capture window associated with a large spatial threshold may include more image frames than a capture window associated with a small spatial threshold. In some examples, a capture window associated with a large temporal threshold may include more image frames than a capture window associated with a small temporal threshold. In some embodiments, more image frames may be desirable over fewer image frames as more image frames may provide more choices for an optimal image frame (e.g., more signal). In some embodiments, fewer image frames may be desirable over more image frames as fewer image frames may provide fewer similar choices for an optimal image frame (e.g., less noise). Operation 204 may be performed by one or more hardware processors configured by machine-readable instructions including a module that is the same as or similar to capture window generation module 110, in accordance with one or more implementations.

In some embodiments, the capture window may be spatially proximate to a pose associated with the detected actuation. For example, the capture window may be spatially proximate to a pose of the capture device associated with when the actuation is detected.

A beginning of the capture window may be greater than a first threshold translation from the pose associated with the detected actuation and an end of the capture window may be less than a second threshold translation from the pose associated with the detected actuation. The first threshold translation and the second threshold translation may be in units of pixels. In some embodiments, the first threshold translation and the second threshold translation may be in units of meters. In some embodiments, the first threshold translation may be 0 meters and the second threshold translation may be 0.5 meters. In these embodiments, the capture window may include image frames within 0.5 meters of the pose associated with the detected actuation.

A beginning of the capture window may be greater than a first threshold rotation from the pose associated with the detected actuation and an end of the capture window may be less than a second threshold rotation from the pose associated with the detected actuation. In some embodiments, the first threshold rotation and the second threshold rotation may be in units of pixels. In some embodiments, the first threshold rotation and the second threshold rotation may be in units of radians. In some embodiments, the first threshold rotation may be 0 radians and the second threshold rotation may be 0.22 radians. In these embodiments, the capture window may include image frames within 0.22 radians of the pose associated with the detected actuation.

In some embodiments, the capture window may be temporally proximate to a time associated with the detected actuation. In some embodiments, the capture window may be a function of capture frame rate. In some embodiments, the capture window may be inversely related to the capture frame rate. For example, if the capture frame rate is fast, the capture window may be small, and if the capture frame rate is slow, the capture window may be large.

A beginning of the capture window is greater than a first threshold time from the time associated with the detected actuation and an end of the capture window is less than a second threshold time from the time associated with the detected actuation. In some embodiments, the capture window may be in units of seconds and may be expressed in units of image frames. In some embodiments, the first threshold time may be −1 seconds and the second threshold time may be 0 seconds. In these embodiments, the capture window may include image frames within 1 second before the detected actuation. In some embodiments, the first threshold may be −0.5 seconds and the second threshold time may be +0.5 seconds. In these embodiments, the capture window may include image frames within 0.5 seconds before the detected actuation and 0.5 seconds after the detected actuation. In some embodiments, the first threshold time may be 0 seconds and the second threshold time may be +1 second. In these embodiments, the capture window may include image frames within 1 second after the detected actuation. In some embodiments, one or more modules, such as capture module 112, may continually capture image frames and those captured image frames may be stored, for example in an image frame buffer, cache, temporary memory, temporary storage, and the like, and associated with the capture window responsive to the detected actuation. In some embodiments, the beginning of the capture window may be temporally before the time associated with the detected actuation, and the end of the capture window may be temporally before the time associated with the detected actuation. In these embodiments, the capture window includes image frames that were captured before to the detected actuation. In some embodiments, the beginning of the capture window may be temporally before the time associated with the detected actuation, and the end of the capture window may be temporally after the time associated with the detected actuation. In these embodiments, the capture window includes image frames that were captured both before and after the detected actuation. In some embodiments, the beginning of the capture window may be temporally after the time associated with the detected actuation, and the end of the capture window may be temporally after the first threshold time. In these embodiments, the capture window includes image frames that were captured after the detected actuation.

An operation 206 may include capturing, within the capture window, a plurality of candidate image frames and sensor data of the capture device. The plurality of candidate image frames are captured by a camera of the capture device at a capture frame rate and the sensor data is associated with the plurality of candidate image frames and related to the capture frame rate. In some embodiments, capturing the plurality of candidate image frames may be based on optical flow. The sensor data may include at least one of inertial sensor data, accelerometer sensor data, gyroscope sensor data, magnetometer sensor data, altimeter sensor data, light sensor data, camera sensor data, pose sensor data, visual data, and depth data. Operation 206 may be performed by one or more hardware processors configured by machine-readable instructions including a module that is the same as or similar to capture module 112, in accordance with one or more implementations.

An operation 208 may include selecting an optimal image frame of the plurality of candidate image frames based on at least one of image data of the plurality of candidate image frames and the sensor data of the capture device. In some embodiments, operation 208 may include selecting a least blurry image frame of the plurality of candidate image frames. Operation 208 may be performed by one or more hardware processors configured by machine-readable instructions including a module that is the same as or similar to image frame selection module 114, in accordance with one or more implementations.

In some embodiments, operation 208 may include selecting the optimal image frame of the plurality of candidate image frames by comparing sensor data associated with each image frame of the plurality of candidate image frames to sensor data associated with each other image frame of the plurality of candidate image frames.

In some embodiments, for each candidate image frame of the plurality of candidate image frames, operation 208 may include determining a shutter speed associated with the candidate image frame based on the sensor data. Operation 208 may include selecting the image frame of the plurality of candidate image frames associated with the fastest shutter speed. In some embodiments, fastest shutter speed may correspond an optimal image frame.

In some embodiments, for each candidate image frame of the plurality of candidate image frames, operation 208 may include determining a degree of capture device rotation associated with the candidate image based on the sensor data. The degree of capture device rotation may be relative to one other candidate image frame of the plurality of candidate image frames. Operation 208 may include selecting the image frame of the plurality of candidate image frames associated with the lowest degree of capture device rotation. In some embodiments, lowest degree of capture device rotation may correspond to an optimal image frame.

In some embodiments, for each candidate image frame of the plurality of candidate image frames, operation 208 may include determining a rate of capture device rotation associated with the candidate image frame based on the sensor data. The rate of capture device rotation may be relative to one other candidate image frame of the plurality of candidate image frames. Operation 208 may include selecting the image frame of the plurality of candidate image frames associated with the lowest rate of capture device rotation. In some embodiments, lowest rate of capture device rotation may correspond to an optimal image frame.

In some embodiments, for each candidate image frame of the plurality of candidate image frames, operation 208 may include determining a degree of capture device translation associated with the candidate image frame based on the sensor data. The degree of capture device translation may be relative to one other candidate image frame of the plurality of candidate images frames. Operation 208 may include selecting the image frame of the plurality of candidate image frames associated with the lowest degree of capture device translation. In some embodiments, lowest degree of capture device translation may correspond to an optimal image frame.

In some embodiments, for each candidate image frame of the plurality of candidate image frames, operation 208 may include determining a rate of capture device translation associated with the candidate image frame based on the sensor data. The rate of capture device translation may be relative to one other candidate image frames of the plurality of candidate image frames. Operation 208 may include selecting the image frame of the plurality of candidate image frames associated with the lowest rate of capture device translation. In some embodiments, lowest rate of capture device translation may correspond to an optimal image frame.

In some embodiments, for each candidate image frame of the plurality of candidate image frames, operation 208 may include calculating a total number of blurred pixels. In some embodiments, operation 208 may include computing image blur for one or more pixels of an image using one or more signal processing techniques such as, for example, computing Fast Fourier Transforms (FFTs) of the image and examining a distribution of low and high frequencies, computing a convolution of a Laplacian kernel across the image and computing a variance of the response, and the like. If the computed image blur is greater than an image blur threshold, operation 208 may include classifying the one or more pixels of the image as being blurry. Operation 208 may include selecting the image frame of the plurality of candidate image frames associated with the fewest total number of blurred pixels. In some embodiments, fewest total number of blurred pixels may correspond to an optimal image frame.

In some embodiments, for each candidate image frame of the plurality of candidate image frames, operation 208 may identify one or more architectural features. In some embodiments, operation 208 may select the image frame of the plurality of candidate image frames including the most architectural features. In some embodiments, most architectural features may correspond to an optimal image frame. By way of non-limiting example, architectural features may include at least one of ground planes, wall planes, ceiling planes, doors, and windows. In some embodiments, if multiple candidate image frames qualify as optimal image frames as per the other aforementioned criteria, most architectural features may be used to select an optimal image frame.

In some embodiments, operation 208 may include selecting the image frame of the plurality of candidate image frames including the most intersections of architectural features. Operation 208 may include identifying intersections of one or more architectural features. In some embodiments, most intersections of architectural features may correspond to an optimal image frame. Examples of intersections of architectural features include inter- and/or intra-intersections between planes such as ground planes, wall planes, and ceiling planes, between doors and planes such as ground planes, wall planes, and ceiling planes, between windows and wall planes, and the like. In some embodiments, if multiple candidate image frames qualify as optimal image frames as per the other aforementioned criteria, most intersections of architectural features may be used to select an optimal image frame.

In some embodiments, for each candidate image frame of the plurality of candidate image frames, operation 208 may include identifying a planar surface in the candidate image frame and calculating an angle between an optical axis of the capture device and a normal of the planar surface, for example based on the sensor data. Operation 208 may include selecting the image frame of the plurality of candidate image frames associated with the largest angle. In some embodiments, largest angle may correspond to an optimal image. In some embodiments, the larger the angle, the more parallel the capture device and the planar surface, such as a wall, are. In some embodiments, larger angles may be desirable for vanishing line estimation and depth calculation purpose.

In some embodiments, for each candidate image frame of the plurality of candidate image frames, operation 208 may include identifying a planar surface in the candidate image frame and calculate an angle between an optical axis of the capture device and a normal of the planar surface, for example based on the sensor data. Operation 208 may include selecting the image frame of the plurality of candidate image frames associated with the smallest angle. In some embodiments, the smaller the angle, the more orthogonal the capture device and the planar surface, such as a wall, are. In some embodiments, smaller angles may be desirable for planar surface coverage as depicted in images.

In some embodiments, operation 208 may include selecting an image frame of the plurality of candidate image frames based on two or more of the aforementioned, for example based on a weighted combination of two or more of the aforementioned.

In some embodiments, operation 208 may include selecting an optimal image frame of a plurality of candidate image frames of a plurality of capture windows. In these embodiments, a plurality of capture windows may be generated, for example in operation 204. In some embodiments, operation 208 may include selecting an optimal image frame of each of the plurality of capture windows, and further selecting an optimal image frame of a plurality of optimal image frames.

An operation 210 may include storing the selected optimal image frame of the plurality of candidate image frames. Operation 210 may be performed by one or more hardware processors configured by machine-readable instructions including a module that is the same as or similar to image frame storage module 116, in accordance with one or more implementations.

In some embodiments, the method 200 may further include distinguishing candidate image frames of the plurality of candidate image frames other than the selected optimal image frame. In some embodiments, the method 200 may further include displaying, on a display of the capture device, the selected optimal image frame. In some embodiments, method 200 may further include displaying, on the display of the capture device, candidate image frames of the plurality of candidate image frames other than the selected optimal image frame.

Figure 3:
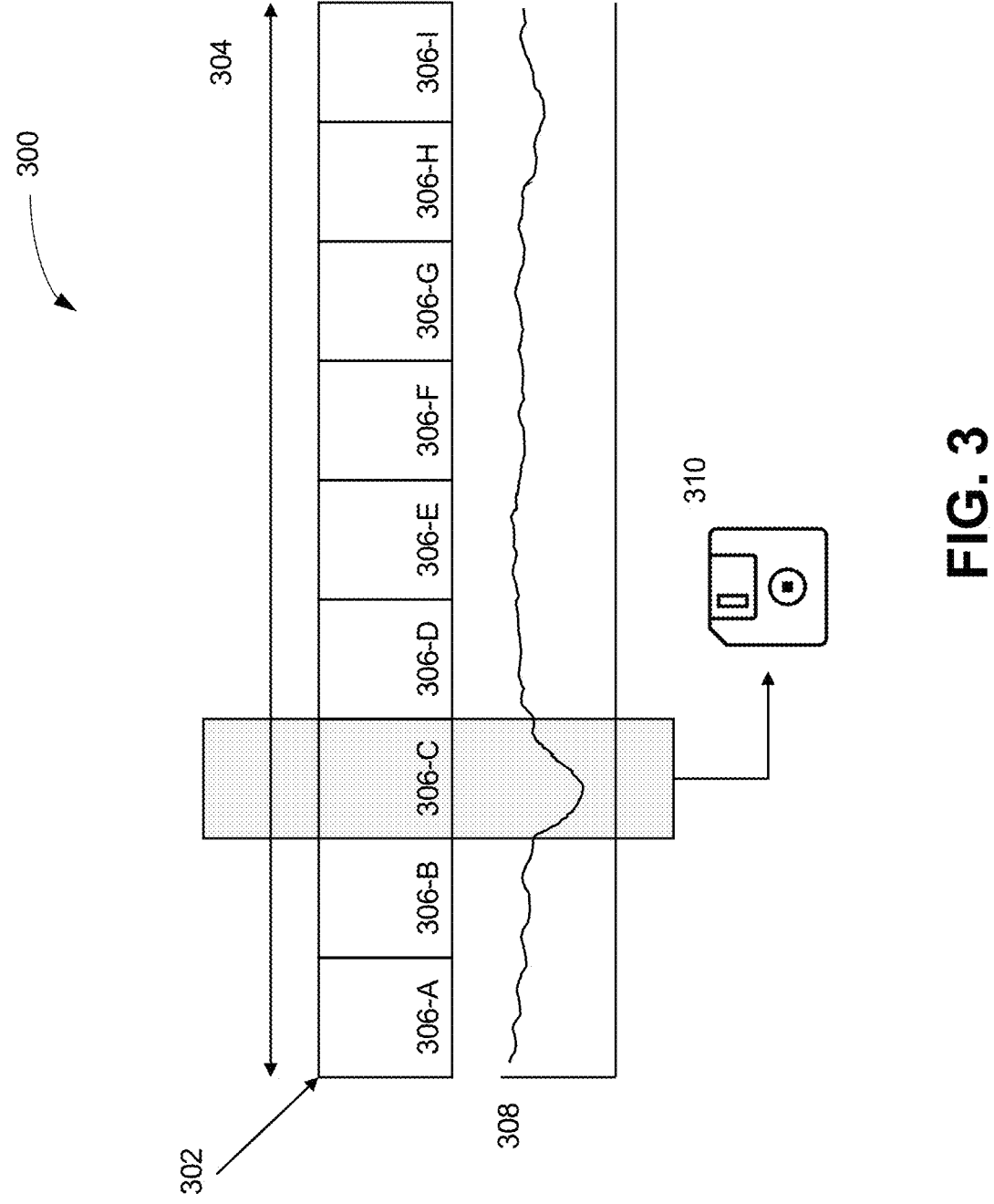
FIG. 3 is an exemplary illustration of selecting an optimal 2D image frame within a capture window, in accordance with one or more implementations.

FIG. 3 is an exemplary illustration of selecting an optimal 2D image frame within a capture window, in accordance with one or more implementations. An actuation of a capture function at a capture device may be detected at 302. Capture window 304 may be generated comprising a plurality of image frames proximate to the actuation detected at 302. In the embodiment illustrated in FIG. 3, there is no gap between the actuation detected 302 and the beginning of capture window 304. In some embodiments, there may be a gap between the actuation detected at 302 and the beginning of capture window 304, for example to accommodate capture device shake from the actuation of the capture function. Candidate image frames 306-A through 306-I may be captured within capture window 304. Data 308 is captured within capture window 304. In some embodiments, data 308 is sensor data. In some embodiments, data 308 is image data. Optimal image frame 306-C of candidate image frames 306-A through 306-I may be selected based on at least one of image data of candidate image frames 306-A through 306-I and sensor data of the capture device. As illustrated in FIG. 3, optimal image frame 306-C corresponds to a minimal value of data 308. The minimal value of data 308 may correspond to one or more of fastest shutter speed, lowest degree of capture device rotation, lowest rate of capture device rotation, lowest degree of capture device translation, lowest rate of capture device translation, fewest blurred pixels, most architectural features, most intersections of architectural features, largest angle between an optical axis of the capture device and a normal of a planar surface in optimal image frame 306-C, smallest angle between an optical axis of the capture device and a normal of a planar surface in optimal image frame 306-C, and the like. Optimal image frame 306-C may be stored in database 310. In some embodiments, candidate image frames other than optimal image frame 306-C may be distinguished. In some embodiments, optimal image frame 306-C may be displayed on a display of the capture device.

Figure 4:
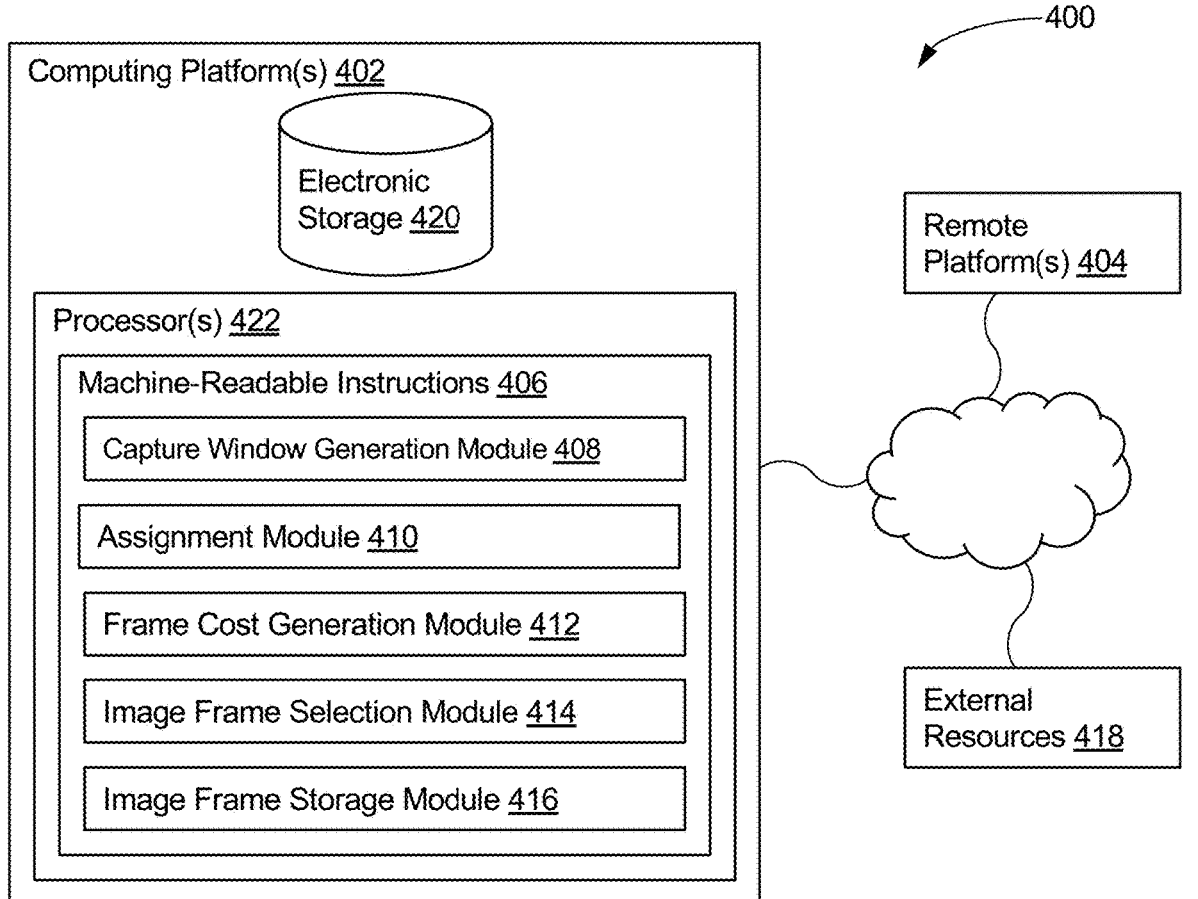
FIG. 4 illustrates a system configured for selecting an optimal 2D image frame within a capture window, in accordance with one or more implementations.

FIG. 4 illustrates a system 400 configured for selecting an optimal 2D image frame within a capture window, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of capture window generation module 408, assignment module 410, frame cost generation module 412, image frame selection module 414, image frame storage module 416, and/or other instruction modules.

Capture window generation module 408 may be configured to generate a capture window comprising a plurality of image frames and relative to a first image frame. In some embodiments, the number of image frames in the capture window may be related to thresholds disclosed here. In some examples, a capture window associated with a large spatial threshold may include more image frames than a capture window associated with a small spatial threshold. In some examples, a capture window associated with a large temporal threshold may include more image frames than a capture window associated with a small temporal threshold. In some embodiments, more image frames may be desirable over fewer image frames as more image frames may provide more choices for an optimal image frame (e.g., more signal). In some embodiments, fewer image frames may be desirable over more image frames as fewer image frames may provide fewer similar choices for an optimal image frame (e.g., less noise). In some embodiments, capture window generation module 408 may be configured to generate the capture window based on sensor data of a capture device. In some embodiments, capture window generation module 408 may be configured to generate the capture window based on image data, for example of the first image frame. In some embodiments, capture window generation module 408 may be configured to generate the capture window such that the capture window is a threshold spatial translation (e.g., 0.5 meters) from a camera pose associated with the first image frame, a threshold spatial orientation (e.g., 0.22 radians) from a camera pose associated with the first image frame, a threshold time (e.g., 0.5 seconds) from a capture time associated with the first image frame, or a combination thereof.

Assignment module 410 may be configured to assign a plurality of candidate image frames to the capture window. Each candidate image frame may be associated with sensor data of a capture device. By way of non-limiting example, the sensor data may include at least one of inertial sensor data, accelerometer sensor data, gyroscope sensor data, magnetometer sensor data, altimeter sensor data, light sensor data, camera sensor data, image data, and depth data.

In some embodiments, assignment module 410 may be configured to generate a spatial sequence independent of a temporal sequence.

In some embodiments, assignment module 410 may be configured to generate the spatial sequence based on sensor data of the capture device, for example associated with the first image frame, one or more candidate image frames, or a combination thereof.

In some embodiments, assignment module 410 may be configured to generate the spatial sequence based on image data, for example of the first image frame, one or more candidate image frames, or a combination thereof. In some embodiments, image data may include visual information. In some embodiments, the visual data may be pixel blur. In some embodiments, the spatial sequence may be based on optical flow, for example relative to the first image frame capture, one or more candidate image frames, or a combination thereof.

In some embodiments, the spatial sequence may be a translation sequence. In some embodiments, assignment module 410 may be configured to assign candidate image frames within a threshold distance of the first image frame to the capture window. In some embodiments, the threshold distance may be in units of pixels. In some embodiments, the threshold distance may be in units of meters, for example 0.5 meters.

In some embodiments, the spatial sequence may be an orientation sequence. In some embodiments, assignment module 410 may be configured to assign candidate image frames within a threshold orientation of the first image frame to the capture window. In some embodiments, the threshold orientation may be in units of pixels. In some embodiments, the threshold orientation may be in units of radians, for example 0.22 radians.

In some embodiments, the spatial sequence may be a combination of a translation sequence and an orientation sequence. In some embodiments, assignment module 410 may be configured to assign candidate image frames within a threshold distance of the first image frame and within a threshold orientation of the first image frame to the capture window. The threshold distance may be 0.5 meters and the threshold orientation may be 0.22 radians.

In some embodiments, sensor data may include degree of freedom changes such as, for example, rate of rotation, degree of rotation, rate of translation, degree of translation, and the like. Assignment module 410 may be configured to assign the plurality of candidate image frames to the capture window based on the degree of freedom changes. In some embodiments, assignment module 410 may be configured to assign candidate image frames with lowest relative degree of freedom changes to the capture window. Candidate image frames with the lowest relative degree of freedom changes may correspond to candidate image frames with the least relative blur in embodiments where degree of freedom changes is directly related to image blur.

Frame cost generation module 412 may be configured to generate a frame cost for each candidate image frame of the plurality of candidate image frames in the capture window. In some embodiments, frame cost may represent usability of the candidate image frame, for example for 3D reconstruction. In some embodiments, a low frame cost may be better than a high frame cost. In some embodiments, a low frame cost may correspond to low image blur and high frame cost may correspond to high image blur. In these embodiments and for 3D reconstruction, the usability of a candidate image frame with a low frame cost may be lower than the usability of a candidate image frame with a high frame cost, as low image blur tends to beneficial for 3D reconstruction that high image blur.

In some embodiments, frame cost generation module 412 may be configured to generate the frame cost based on sensor data associated with the candidate image frame. In some embodiments, frame cost for a candidate image frame may be high if sensor data values of the candidate image frame are high (e.g., large rate of rotation, large degree of rotation, large rate of translation, large degree of translation, and the like) relative to sensor data values of the first image frame, other candidate image frames, or a combination thereof.

In some embodiments, sensor data may include degree of freedom changes such as, for example, rate of rotation, degree of rotation, rate of translation, degree of translation, and the like. Frame cost generation module 412 may be configured to generate the frame cost based on the degree of freedom changes. In some embodiments, frame cost for a candidate image frame may be high if degree of freedom changes is high (e.g., degree of change of rate of rotation, degree of change of degree of rotation, degree of change of rate of translation, degree of change of degree of translation, and the like) relative to the first image frame, other candidate image frames, or a combination thereof.

In some embodiments, frame cost generation module 412 may be configured to generate the frame cost based on the image data of the candidate image frame. In some embodiments, frame cost for a candidate image frame may be high if image data values of the candidate image frame are high (e.g., large number of blurred pixels, large optical flow values, and the like) relative to image data values of first image frame, other candidate image frames, or a combination thereof.

Image frame selection module 414 may be configured to select an optimal image frame of the plurality of candidate image frames in the capture window based on a lower frame cost relative to at least one other candidate image frame of the plurality of candidate image frames. In some embodiments, image frame selection module 414 may be configured to select an optimal image frame of the plurality of candidate image frames in the capture window based on a lowest frame cost. In some embodiments, image frame selection module 414 may be configured to select a least blurry image frame of the plurality of image frames.

In some embodiments, image frame selection module 414 may be configured to select an optimal image frame of a plurality of candidate image frames of a plurality of capture windows. In these embodiments, capture window generation module 408 may be configured to generate the plurality of capture windows. In some embodiments, image frame selection module 414 may be configured to select an optimal image frame of each of the plurality of capture windows, and further select an optimal image frame of a plurality of optimal image frames.

Image frame storage module 416 may be configured to store the selected optimal image frame of the plurality of candidate image frames.

In some embodiments, one or more modules may be configured to distinguish candidate image frames of the plurality of candidate image frames other than the selected optimal image frame.

In some embodiments, one or more modules may be configured to display the selected optimal image frame on a display of the capture device. In some embodiments, one or more modules may be configured to display candidate image frames other than the selected optimal image frame on the display of the capture device.

In some implementations, computing platform(s) 402, remote platform(s) 404, and/or external resources 418 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 418 may be operatively linked via some other communication media.

A given remote platform 404 may include one or more processors configured to execute computer program modules. The computer program modules may be configured to enable an expert or user associated with the given remote platform 404 to interface with system 400 and/or external resources 418, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 418 may include sources of information outside of system 400, external entities participating with system 400, and/or other resources. In some implementations, some or all of the functionality attributed herein to external resources 418 may be provided by resources included in system 400.

Computing platform(s) 402 may include electronic storage 420, one or more processors 422, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 420 may comprise non-transitory storage media that electronically stores information. The electronic storage media of electronic storage 420 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 420 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 420 may include one or more virtual storage resources (e.g., cloud storage, a virtual private network, and/or other virtual storage resources). Electronic storage 420 may store software algorithms, information determined by processor(s) 422, information received from computing platform(s) 402, information received from remote platform(s) 404, and/or other information that enables computing platform(s) 402 to function as described herein.

Processor(s) 422 may be configured to provide information processing capabilities in computing platform(s) 402. As such, processor(s) 422 may include one or more of a digital processor, an analog processor, a digital circuit designed to process information, an analog circuit designed to process information, a state machine, and/or other mechanisms for electronically processing information. Although processor(s) 422 is shown in FIG. 4 as a single entity, this is for illustrative purposes only. In some implementations, processor(s) 422 may include a plurality of processing units. These processing units may be physically located within the same device, or processor(s) 422 may represent processing functionality of a plurality of devices operating in coordination. Processor(s) 422 may be configured to execute modules 408, 410, 412, 414, and/or 416, and/or other modules. Processor(s) 422 may be configured to execute modules 408, 410, 412, 414, and/or 416, and/or other modules by software; hardware; firmware; some combination of software, hardware, and/or firmware; and/or other mechanisms for configuring processing capabilities on processor(s) 422. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, and/or 416 are illustrated in FIG. 4 as being implemented within a single processing unit, in implementations in which processor(s) 422 includes multiple processing units, one or more of modules 408, 410, 412, 414, and/or 416 may be implemented remotely from the other modules. The description of the functionality provided by the different modules 408, 410, 412, 414, and/or 416 described below is for illustrative purposes, and is not intended to be limiting, as any of modules 408, 410, 412, 414, and/or 416 may provide more or less functionality than is described. For example, one or more of modules 408, 410, 412, 414, and/or 416 may be eliminated, and some or all of its functionality may be provided by other ones of modules 408, 410, 412,

414, and/or 416. As another example, processor(s) 422 may be configured to execute one or more additional modules that may perform some or all of the functionality attributed below to one of modules 408, 410, 412, 414, and/or 416.

Figure 5:
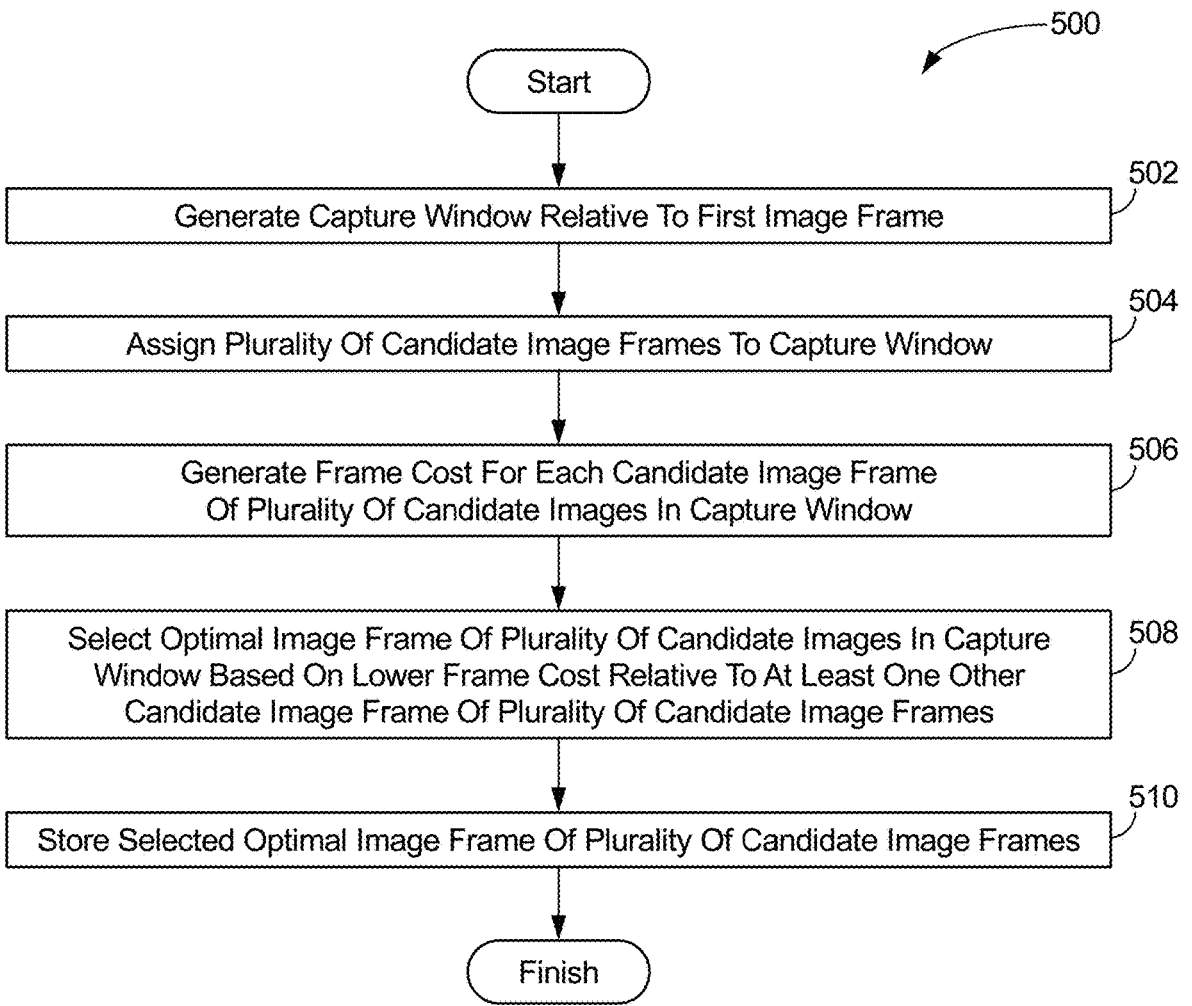
FIG. 5 illustrates a method for selecting an optimal 2D image frame within a capture window, in accordance with one or more implementations.

FIG. 5 illustrates a method 500 for selecting an optimal 2D image frame within a capture window, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include generating a capture window comprising a plurality of image frames and relative to a first image frame capture. In some embodiments, the number of image frames in the capture window may be related to thresholds disclosed here. In some examples, a capture window associated with a large spatial threshold may include more image frames than a capture window associated with a small spatial threshold. In some examples, a capture window associated with a large temporal threshold may include more image frames than a capture window associated with a small temporal threshold. In some embodiments, more image frames may be desirable over fewer image frames as more image frames may provide more choices for an optimal image frame (e.g., more signal). In some embodiments, fewer image frames may be desirable over more image frames as fewer image frames may provide fewer similar choices for an optimal image frame (e.g., less noise). In some embodiments, operation 502 may include generating the capture window based on sensor data of a capture device. In some embodiments, operation 502 may include generating the capture window based on image data, for example of the first image frame. In some embodiments, operation 502 may include generating the capture window such that the capture window is a threshold spatial translation (e.g., 0.5 meters) from a camera pose associated with the first image frame, a threshold spatial orientation (e.g., 0.22 radians) from a camera pose associated with the first image frame, a threshold time (e.g., 0.5 seconds) from a capture time associated with the first image frame, or a combination thereof. Operation 502 may be performed by one or more hardware processors configured by machine-readable instructions including a module that is the same as or similar to capture window generation module 408, in accordance with one or more implementations.

An operation 504 may include assigning a plurality of candidate image frames to the capture window. Each candidate image frame may be associated with sensor data of a capture device. By way of non-limiting example, the sensor data may include at least one of inertial sensor data, accelerometer sensor data, gyroscope sensor data, magnetometer sensor data, altimeter sensor data, light sensor data, camera sensor data, image data, and depth data. Operation 504 may be performed by one or more hardware processors configured by machine-readable instructions including a module that is the same as or similar to assignment module 410, in accordance with one or more implementations.

In some embodiments, operation 504 may include generating a spatial sequence independent of a temporal sequence.

In some embodiments, operation 504 may include generating the spatial sequence based on sensor data of the capture device, for example associated with the first image frame, one or more candidate image frames, or a combination thereof.

In some embodiments, operation 504 may include generating the spatial sequence based on image data, for example of the first image frame, one or more candidate image frames, or a combination thereof. In some embodiments, image data may include visual information. In some embodiments, the visual data may be pixel blur. In some embodiments, the spatial sequence may be based on optical flow, for example relative to the first image frame capture, one or more candidate image frames, or a combination thereof.

In some embodiments, the spatial sequence may be a translation sequence. In some embodiments, candidate image frames within a threshold distance of the first image frame may be assigned to the capture window. In some embodiments, the threshold distance may be in units of pixels. In some embodiments, the threshold distance may be in units of meters, for example 0.5 meters.

In some embodiments, the spatial sequence may be an orientation sequence. In some embodiments, candidate image frames within a threshold orientation of the first image frame may be assigned to the capture window. In some embodiments, the threshold orientation may be in units of pixels. In some embodiments, the threshold orientation may be in units of radians, for example 0.22 radians.

In some embodiments, sensor data may include degree of freedom changes such as, for example, rate of rotation, degree of rotation, rate of translation, degree of translation, and the like. In some embodiments, operation 504 may include assigning the plurality of candidate image frames to the capture window based on the degree of freedom changes. In some embodiments, candidate image frames with lowest relative degree of freedom changes may be assigned to the capture window. Candidate image frames with the lowest relative degree of freedom changes may correspond to candidate image frames with the least relative blur in embodiments where degree of freedom changes is directly related to image blur.

An operation 506 may include generating a frame cost for each candidate image frame of the plurality of candidate image frames in the capture window. In some embodiments, frame cost may represent usability of the candidate image frame, for example for 3D reconstruction. In some embodiments, a low frame cost may be better than a high frame cost. In some embodiments, a low frame cost may correspond to low image blur and high frame cost may correspond to high image blur. In these embodiments and for 3D reconstruction, the usability of a candidate image frame with a low frame cost may be lower than the usability of a candidate image frame with a high frame cost, as low image blur tends to beneficial for 3D reconstruction that high image blur. Operation 506 may be performed by one or more hardware processors configured by machine-readable instructions including a module that is the same as or similar to frame cost generating module 412, in accordance with one or more implementations.

In some embodiments, operation 506 may include generating the frame cost based on sensor data associated with the candidate image frame. In some embodiments, frame cost for a candidate image frame may be high if sensor data values of the candidate image frame are high (e.g., large rate of rotation, large degree of rotation, large rate of translation, large degree of translation, and the like) relative to sensor data values of the first image frame, other candidate image frames, or a combination thereof.

In some embodiments, sensor data may include degree of freedom changes such as, for example, rate of rotation, degree of rotation, rate of translation, degree of translation, and the like. Operation 506 may include generating the frame cost based on the degree of freedom changes. In some embodiments, frame cost for a candidate image frame may be high if degree of freedom changes is high (e.g., degree of change of rate of rotation, degree of change of degree of rotation, degree of change of rate of translation, degree of change of degree of translation, and the like) relative to the first image frame, other candidate image frames, or a combination thereof.

In some embodiments, operation 506 may include generating the frame cost based on the image data of the candidate image frame. In some embodiments, frame cost for a candidate image frame may be high if image data values of the candidate image frame are high (e.g., large number of blurred pixels, large optical flow values, and the like) relative to image data values of first image frame, other candidate image frames, or a combination thereof.

An operation 508 may include selecting an optimal image frame of the plurality of candidate image frames in the capture window based on a lower frame cost relative to at least one other candidate image frame of the plurality of candidate image frames. In some embodiments, operation 508 may include selecting an optimal image frame of the plurality of candidate image frames in the capture window based on a lowest frame cost. In some embodiments, operation 508 may include selecting a least blurry image frame of the plurality of image frames. Operation 508 may be performed by one or more hardware processors configured by machine-readable instructions including a module that is the same as or similar to image frame selection module 414, in accordance with one or more implementations.

In some embodiments, operation 508 may include selecting an optimal image frame of a plurality of candidate image frames of a plurality of capture windows. In these embodiments, operation 502 may include generating the plurality of capture windows. In some embodiments, operation 508 may include selecting an optimal image frame of each of the plurality of capture windows, and further selecting an optimal image frame of a plurality of optimal image frames.

An operation 510 may include storing the selected optimal image frame of the plurality of candidate image frames. Operation 510 may be performed by one or more hardware processors configured by machine-readable instructions including a module that is the same as or similar to image storing module 416, in accordance with one or more implementations.

In some embodiments, method 500 may further include distinguishing candidate image frames of the plurality of candidate image frames other than the selected optimal candidate image frame.

In some embodiments, method 500 may include displaying the selected optimal image frame on a display of the capture device. In some embodiments, method 500 may include displaying candidate image frames other than the selected optimal candidate image frame on the display of the capture device.

Figure 6:
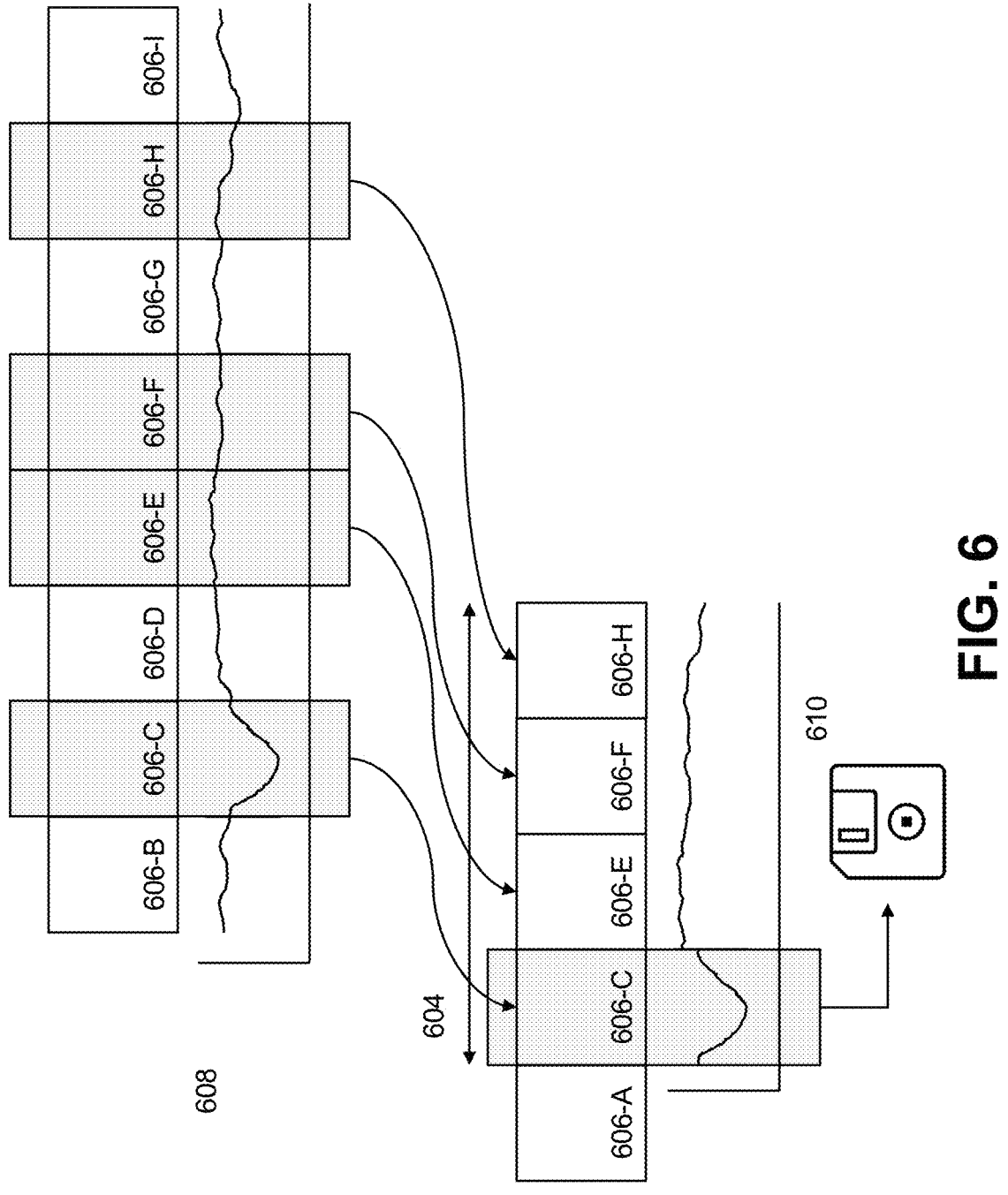
FIG. 6 is an exemplary illustration of selecting an optimal 2D image frame within a capture window, in accordance with one or more implementations.

FIG. 6 is an exemplary illustration of selecting an optimal 2D image frame within a capture window, in accordance with one or more implementations. Capture window 604 may be generated comprising a plurality of image frames and relative to image frame 606-A. Image frames 606-B through 606-I may be a set of temporally sequential image frames. Of image frames 606-B through 606-I, image frames 606-C, 606-E, 606-F, and 606-H may be assigned to capture window 604 as candidate image frames 606-C, 606-E, 606-F, and 606-H. In some embodiments, image frames 606-C, 606-E, 606-F, and 606-H may generate a spatial sequence independent of the temporal sequence of image frames 606-B through 606-I. In some embodiments, the spatial sequence including image frames 606-C, 606-E, 606-F, and 606-H may be generated based on data 608. In some embodiments, data 608 is sensor data. For example, data 608 of image frames 606-C, 606-E, 606-F, and 606-H may indicate these image frames are within a threshold distance (e.g., 0.5 meters) of image frame 606-A. In some embodiments, data 608 is image data. A frame cost for each candidate image frame 606-C, 606-E, 606-F, and 606-H may be generated. In some embodiments, the frame cost may be based on data 608 associated with each candidate image frame 606-C, 606-E, 606-F, and 606-H. In some embodiments, a low value of data 608 may correspond to a low frame cost and a high value of data 608 may correspond to a high frame cost. Optimal image frame 606-C of candidate image frames 606-C, 606-E, 606-F, and 606-H may be selected based on image frame 606-C having a lower frame cost relative to candidate image frames 606-E, 606-F, and 606-H. Optimal image frame 606-C may be stored in database 610. In some embodiments, candidate image frames candidate image frames 606-E, 606-F, and 606-H may be distinguished. In some embodiments, optimal image frame 606-C may be displayed on a display of a capture device.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of selecting an optimal two-dimensional image frame within a capture window for a three-dimensional reconstruction pipeline, the method comprising:

detecting an actuation of a capture function at a capture device;

generating a capture window comprising a plurality of sequential image frames proximate to the detected actuation;

capturing, within the capture window, a plurality of candidate image frames comprising image data of a respective candidate image frame and sensor data of the capture device, wherein the plurality of candidate image frames are captured by a camera of the capture device at a capture frame rate, and wherein the sensor data of the capture device is associated with the plurality of candidate image frames and related to the capture frame rate;

selecting an optimal image frame of the plurality of candidate image frames in the capture window based on a lower frame cost relative to at least one other candidate image frame according to the sensor data of the capture device for each candidate image frame of the plurality of candidate image frames; and storing the selected optimal image frame of the plurality of candidate image frames.

2. The method of claim 1, wherein the capture function is at least one of a physical button of the capture device and a digital button of the capture device.

3. The method of claim 1, wherein the capture window is spatially proximate to a pose associated with the detected actuation.

4. The method of claim 3, wherein a beginning of the capture window is greater than a first threshold translation from the pose associated with the detected actuation and an end of the capture window is less than a second threshold translation from the pose associated with the detected actuation.

5. The method of claim 4, wherein the first threshold translation and the second threshold translation are in units of pixels.

6. The method of claim 4, wherein the first threshold translation is 0 meters and the second threshold translation is 0.5 meters.

7. The method of claim 3, wherein a beginning of the capture window is greater than a first threshold rotation from the pose associated with the detected actuation and an end of the capture window is less than a second threshold rotation from the pose associated with the detected actuation.

8. The method of claim 7, wherein the first threshold rotation and the second threshold rotation are in units of pixels.

9. The method of claim 7, wherein the first threshold rotation is 0 radians and the second threshold rotation is 0.22 radians.

10. The method of claim 3, wherein capturing the plurality of candidate image frames is based on optical flow.

11. The method of claim 1, wherein the capture window is temporally proximate to a time associated with the detected actuation.

12. The method of claim 11, wherein a beginning of the capture window is greater than a first threshold time from the time associated with the detected actuation and an end of the capture window is less than a second threshold time from the time associated with the detected actuation.

13. The method of claim 12, wherein the first threshold time is 0 seconds and the second threshold time is 1 second.

14. The method of claim 1, wherein the sensor data comprises at least one of inertial sensor data, accelerometer sensor data, gyroscope sensor data, magnetometer sensor data, and altimeter sensor data.

15. The method of claim 1, wherein the sensor data comprises light sensor data, camera sensor data, visual data, and depth data.

16. The method of claim 1, wherein selecting the optimal image frame of the plurality of candidate image frames comprises selecting a least blurry image frame of the plurality of candidate image frames.

17. The method of claim 1, wherein selecting the optimal image frame of the plurality of candidate image frames comprises comparing sensor data associated with each candidate image frame of the plurality of candidate image frames to sensor data associated with each other candidate image frame of the plurality of candidate image frames.

18. The method of claim 17, wherein selecting the optimal image frame of the plurality of image frames comprises selecting an image frame of the plurality of candidate image frames associated with at least one of: a fastest shutter speed, a lowest degree of capture device rotation, a lowest rate of capture device rotation, a lowest degree of capture device translation, a lowest rate of capture device translation, fewest total number of blurred pixels, most architectural features, and most intersections of architectural features.

19. A method of selecting an optimal two-dimensional image frame within a capture window for a three-dimensional reconstruction pipeline, the method comprising:

detecting an actuation of a capture function at a capture device;

generating a capture window comprising a plurality of image frames, wherein the capture window is spatially proximate to a pose associated with the detected actuation, and wherein a beginning of the capture window is greater than a first threshold translation from the pose associated with the detected actuation and an end of the capture window is less than a second threshold translation from the pose associated with the detected actuation;

capturing, within the capture window, a plurality of candidate image frames and sensor data of the capture device, wherein the plurality of image frames are captured by a camera of the capture device at a capture frame rate, and wherein the sensor data is associated with the plurality of candidate image frames and related to the capture frame rate;

selecting an optimal image frame of the plurality of candidate image frames based on at least one of image data of the plurality of candidate image frames and the sensor data of the capture device; and storing the selected optimal image frame of the plurality of candidate image frames.

20. A method of selecting an optimal two-dimensional image frame within a capture window for a three-dimensional reconstruction pipeline, the method comprising:

detecting an actuation of a capture function at a capture device;

generating a capture window comprising a plurality of image frames, wherein the capture window is spatially proximate to a pose associated with the detected actuation, and wherein a beginning of the capture window is greater than a first threshold rotation from the pose associated with the detected actuation and an end of the capture window is less than a second threshold rotation from the pose associated with the detected actuation;

capturing, within the capture window, a plurality of candidate image frames and sensor data of the capture device, wherein the plurality of image frames are captured by a camera of the capture device at a capture frame rate, and wherein the sensor data is associated with the plurality of candidate image frames and related to the capture frame rate;

selecting an optimal image frame of the plurality of candidate image frames based on at least one of image data of the plurality of candidate image frames and the sensor data of the capture device; and storing the selected optimal image frame of the plurality of candidate image frames.

* * * * *